(12) United States Patent
Somasekhar et al.

(10) Patent No.: US 7,710,295 B2
(45) Date of Patent: May 4, 2010

(54) INVERTER BASED RETURN-TO-ZERO (RZ)+NON-RZ (NRZ) SIGNALING

(75) Inventors: Dinesh Somasekhar, Portland, OR (US); Sourav Saha, Kolkata (IN); Gregory E. Ruhl, Portland, OR (US); Ashoke Ravi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 11/644,348

(22) Filed: Dec. 22, 2006

(65) Prior Publication Data

US 2008/0152356 A1 Jun. 26, 2008

(51) Int. Cl.
*H03M 5/16* (2006.01)
(52) U.S. Cl. .................... 341/69; 326/82; 327/108; 327/308
(58) Field of Classification Search .......... 341/68, 341/69; 327/108, 308; 326/26, 82
See application file for complete search history.

(56) References Cited

U.S. PATENT DOCUMENTS

| 5,528,166 | A | 6/1996 | Iikbahar | |
|---|---|---|---|---|
| 6,256,235 | B1 | 7/2001 | Lee | |
| 6,657,470 | B1 * | 12/2003 | Latham et al. | 327/202 |
| 2002/0084800 | A1 | 7/2002 | Crittenden et al. | |
| 2005/0057280 | A1 | 3/2005 | Groen et al. | |
| 2006/0083079 | A1 * | 4/2006 | Hwang et al. | 365/189.09 |
| 2006/0179372 | A1 | 8/2006 | Volk | |
| 2007/0013411 | A1 * | 1/2007 | Asaduzzaman et al. | 326/83 |

FOREIGN PATENT DOCUMENTS

| EP | 1 492 286 | 12/2004 |
|---|---|---|
| EP | 1492286 | 12/2004 |
| JP | 2004-015621 | 1/2004 |

OTHER PUBLICATIONS

Zhang Low-Swing Interconnect Interface Circuits; 1998 ACM, pp. 161-166.
Zhang et al. Low-Swing On-Chip Signaling Techniques Effectiveness and Robustness; IEEE Transactions on Very Large Scale Integration (VLSI) Systems, vol. 8, No. 3, Jun. 2000 pp. 264-272.
Golshan et al. A Novel Reduced Swing CMOS BUS Interface Circuit for High Speed Low Power VLSI Systems; pp. 351-354 Positron Ind. Inc. Engineering Dep't; Dep't of EE, Concordia Univ. Montreal, Quebec, Canada.
Mallik et al Advanced Package Technologies for High-Performance Systems; Intel Technology Journal, vol. 9, Issue 4, 2005, pp. 259-272.
Notice of Preliminary Rejection for Korean Patent Application No. 10-2007-135205 mailed Jun. 25, 2009, incl. translation, Whole document.

(Continued)

*Primary Examiner*—Howard Williams
(74) *Attorney, Agent, or Firm*—Blakely, Sokoloff, Taylor & Zafman LLP

(57) ABSTRACT

Embodiments of the invention are generally directed to systems, methods, and apparatuses for inverter based return-to-zero (RZ)+non-RZ (NRZ) signaling. The interface circuit contains multiple ganged drivers (some or all of them are turned on at one point of time) and edge detection circuitry (to configure/modulate edges of the input data signal). These two circuits together generate weighted return-to-zero (RZ)+non-RZ (NRZ) signal.

26 Claims, 8 Drawing Sheets

OTHER PUBLICATIONS

GBPTO, "First Office Action & Search Report", Application No. GB 0724814.9, mailed Mar. 31, 2008, 5 pages.

GBPTO, "Second Office Action", Application No. GB0724814.9, Mailed Aug. 13, 2009, 2 pages.

* cited by examiner

800

INVERTER BASED RETURN-TO-ZERO (RZ)+NON-RZ (NRZ) SIGNALING

TECHNICAL FIELD

Embodiments of the invention generally relate to the field of integrated circuits and, more particularly, to systems, methods and apparatuses for inverter based return-to-zero (RZ)+Non-RZ signaling.

BACKGROUND

Conventional interfaces typically use either a return-to-zero signaling scheme or a non-return-to-zero signaling scheme. Return-to-zero (RZ) signaling refers to a signaling scheme in which the signal returns to zero between each pulse. The signal returns-to-zero between pulses even if a number of consecutive zeros or ones occur in the signal. Since the signal returns to zero between each pulse, a separate clock signal is, typically, not needed in the RZ signaling scheme.

Non-return-to-zero (NRZ) refers to a signaling scheme in which logic highs are represented by one significant condition and logic lows are represented by another significant condition with no neutral or rest condition. Since the pulses do not have a rest state, a synchronization signal is typically sent alongside the data signal.

Three dimensional (3D) die stacking refers to vertically integrating two or more die with, for example, a dense, high-speed interface. One or more of the stacked die may include a bus for which I/O needs to be performed. The bus may include a number of bit lines and each bit line may have a different length. In conventional systems, bit lines are length matched using, for example, delay buffers. The use of delay buffers to length match the bit lines can significantly increase the complexity of designing a die. Delay buffers may also lower performance by increasing latency (e.g., due to inverters in the signal path).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for a signaling scheme that implements a weighted NRZ+RZ signal. The weighted NRZ+RZ signal may be driven, for example, on inter-die and/or intra-die interconnects. The signaling scheme may be effective in decreasing the latency of signal propagation on the line. In some embodiments, the signal latency can be made to approach the flight time of the line.

Figure 1:
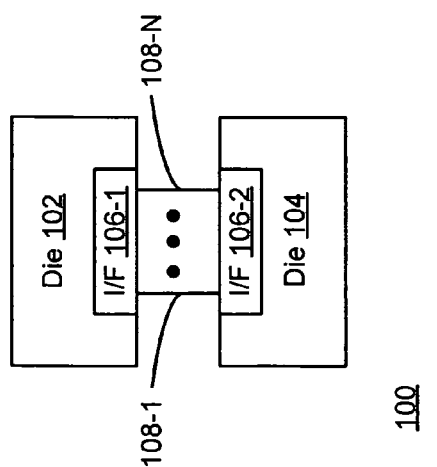
FIG. 1 is a high-level block diagram illustrating selected aspects of an embodiment of the invention.

FIG. 1 is a high-level block diagram illustrating selected aspects of a device 100 implemented according to an embodiment of the invention. Device 100 may include die 102 that communicates with die 104 through interfaces 106. In some embodiments, interfaces 106 use a signaling scheme that is a weighted sum of the corresponding NRZ and RZ waveforms on the interconnect (e.g. on vias 108). As is further discussed below, with reference to FIGS. 2-10, the signaling scheme employed by interfaces 106 may support configurable edges and/or configurable swing voltages for signals transmitted on the interconnect (e.g., on vias 108). Such a signaling scheme is particularly useful when it is important to match the delays on wires that are dissimilarly routed.

Interfaces 106 may communicate with each other using an interconnect that may include one or more die-to-die vias 108. Vias 108 may be electrically conductive to allow electrical signals to pass between dies 102 and 104. Vias 108 may be constructed with material such as aluminum, copper, silver, gold, combinations thereof, or other electrically conductive material.

Dies 102 and 104 may include circuitry corresponding to various components of a computing system. For example, die 102 may include a memory device and die 104 may include one or more processing cores and/or shared or private caches. In some embodiments, dies 102 and 104 may overlap partially. In other embodiments, dies 102 and 104 may overlap fully or not at all. Accordingly, dies 102 and 104 may have a three-dimensional (3D) stacking configuration. Such a configuration may provide for utilization of disparate process technologies. For example, dies 102 and 104 may be bonded after alignment of the vias 108. Also, a 3D configuration may provide for a higher density when packaging semiconductor devices. A 3D configuration may also enable more efficient system-on-chip or system-on-stack (SOS) solutions for computing devices or systems. Furthermore, even though FIG. 1 only illustrates two dies, additional dies may be used to integrate other components into the same device.

Figure 2:
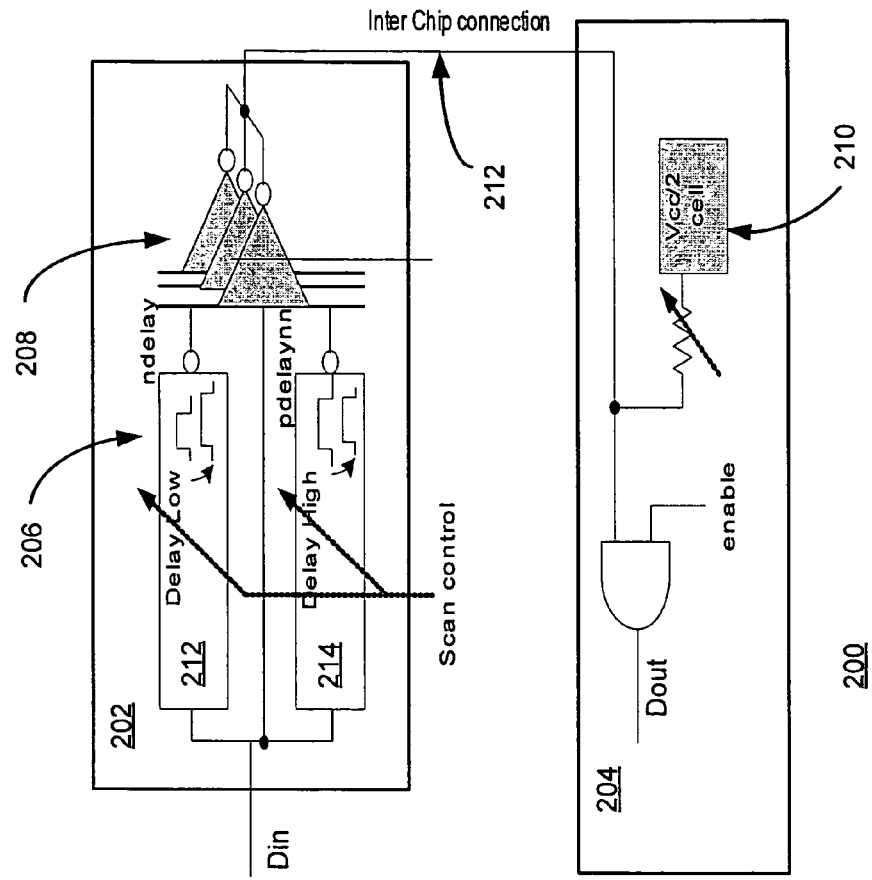
FIG. 2 is a block diagram illustrating selected aspects of an interface circuit implemented according to an embodiment of the invention.

FIG. 2 is a block diagram illustrating selected aspects of an interface circuit, implemented according to an embodiment of the invention. Circuit 200 illustrates selected portions of a driver 202 and a receiver 204 suitable for inter-chip and/or intra-chip communication according to an embodiment of the invention. For ease of description, only a single instance of a driver and/or a receiver are shown. It is to be appreciated, however, that an interface (e.g., interface 106, shown in FIG. 1) may include nearly any number of drivers and/or receivers. In addition, each driver and/or receiver may include more elements, fewer elements, and/or different elements than those shown in FIG. 2.

In the illustrated embodiment, driver 202 includes edge detect circuitry 206 (e.g., short pulse generator with selectable pulse width) and driver circuitry 208. Edge detect circuitry 206 receives, as an input a data signal and provides short pulses when it detects a positive/negative going data transition. Component 214 receives an inverted data signal and its output is used to modulate swing and edge rate of a leading edge signal, whereas component 212 receives a data signal in true polarity and its output is used to modulate the swing and edge rate of trailing edge signal. In an alternative embodiment, detect circuitry 206 may include more elements, fewer elements, and/or different elements.

In some embodiments, driver circuitry 208 includes a plurality of drivers having outputs that are coupled together (e.g., in parallel). The plurality of drivers may be used to selectively adjust the amount of driver current provided by driver 202. For example, during a first portion of a transmission cycle, driver circuitry 208 may provide a first level of driver current. Similarly, during a second portion of the transmission cycle, driver circuitry 208 may provide a second level of driver current. The first level of driver current may be greater than the second level to ensure that receiver 204 is tripped. The ability to selectively control the amount of driver current enables driver 202 to employ the weighted sum of the NRZ and RZ waveforms on the line.

In some embodiments, the selective control of driver current enables driver 202 to modulate the edge rate of a transmitted signal. For example, the edge of a transmitted signal can be increased by increasing the driver current (e.g., by activating more drivers). Similarly, the edge rate of a transmitted signal can be decreased by decreasing the driver current. In some embodiments, the edge rate may be relatively large (e.g., approaching full strength) during a first (e.g., initial) portion of a transmission cycle and then may be reduced during a second portion of the transmission cycle.

In some embodiments, the selective control of driver current enables driver 202 to modulate the voltage swing of a transmitted signal. For example, the voltage swing of a transmitted signal can be increased by increasing the driver current (e.g., by activating more drivers). Similarly, the voltage swing of a transmitted signal can be decreased by decreasing the driver current. In some embodiments, the voltage swing may be relatively large (e.g., approaching the rail voltage) during a first (e.g., initial) portion of a transmission cycle and then may be reduced during a second portion of the transmission cycle.

In some embodiments, all of the drivers and receivers are tuned to the same settings (in terms of voltage and/or edge rates) via scan. This enables the driver to oscillate very closely to the trip point of the receiving device (e.g., Vt of the transistor) at Vcc/2 (~0.5 V or so). For example, in some embodiments, the driver only has to increase the voltage on the transmission line by 0.2V to switch the device (0.7V-0.5V=0.2V versus 0.7V for full rail-to-rail switching). Increasing the line voltage by 0.2V is significantly faster than increasing it by 0.7V and thus reduces the effect of line length. It also reduces the strength of the required driver. In alternative embodiments, each driver/receiver pair may be independently tuned.

Figure 3B:
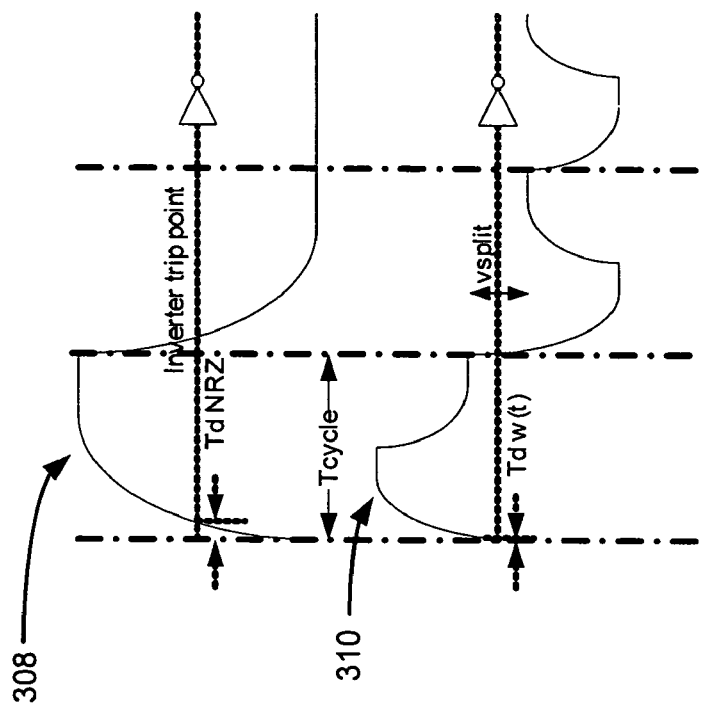
FIGS. 3A and 3B illustrate signal waveforms of an interface circuit implemented according to an embodiment of the invention.
Figure 3A:
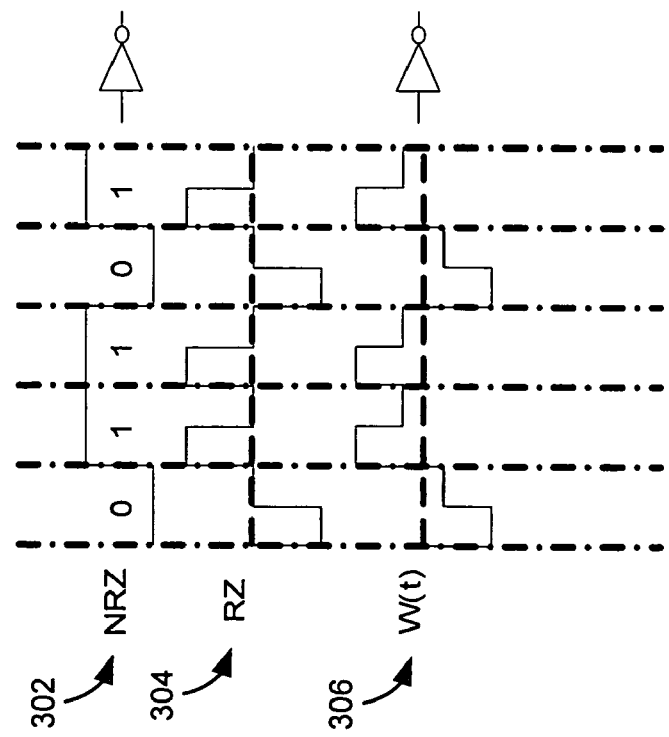

FIGS. 3A and 3B illustrate the use of a weighted sum signal according to an embodiment of the invention. Waveforms 302 and 304 respectfully illustrate idealized NZ and NRZ waveforms for a bit sequence that includes 01101. Waveform 306 illustrates the line $W(t)=a \cdot W_{NRZ}(t)+b \cdot W_{RZ}(t)$ as constructed from waveforms 302 and 304. In some embodiments, W(t) is centered on the trip-point of an inverter (e.g., an inverter in receiver 204). The W(t) waveform exhibits some properties that are different than those provided by either the NRZ or the RZ waveforms. For example, unlike the RZ waveform, the W(t) waveform can be recovered using an inverter. Also, since W(t) starts close to the trip-point of an inverter a substantial portion of the RC delay of the line is removed. Since the actual delay of the line is the sum of the flight time and the RC component, the delay can be made to approach the flight time of the line.

FIG. 3B illustrates actual waveforms corresponding to idealized waveforms 302 and 306. In particular, waveform 308 corresponds to NRZ waveform 302 and waveform 310 corresponds to W(t) waveform 306. The waveforms shown in FIG. 3B are referred to as "actual" waveforms because they represent the way waveforms generated from CMOS circuits are likely to appear.

Figure 4:
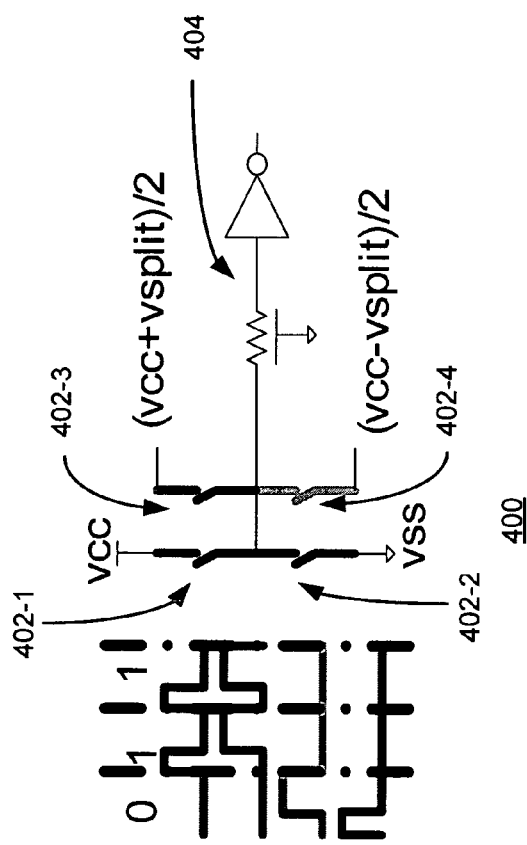
FIG. 4 is a circuit diagram of selected aspects of an interface circuit implemented according to an embodiment of the invention.

FIG. 4 is a circuit diagram of an idealized embodiment of a driver according to an embodiment of the invention. Circuit 400 generates W(t) by sequencing four switches (402) between Vcc, Vss, Vsplit/2. The four switches (402) may be sequenced around the midpoint of interconnect 404.

Figure 5:
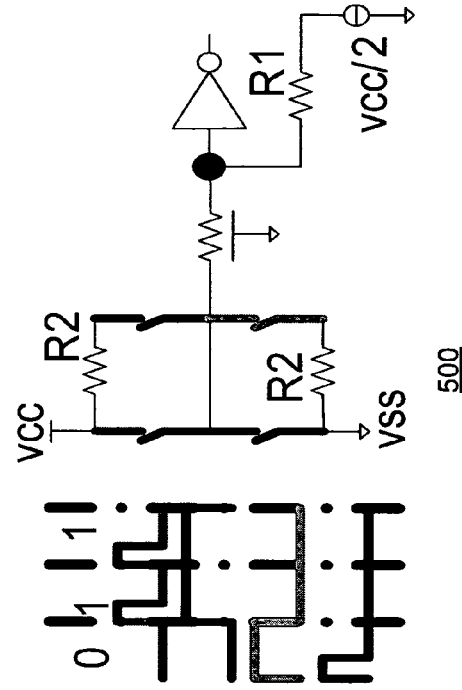
FIG. 5 is a circuit diagram of selected aspects of an interface circuit implemented according to an embodiment of the invention.

FIG. 5 is a circuit diagram of an alternative embodiment of a driver implemented according to an embodiment of the invention. Unlike circuit 400, circuit 500 does not have a power supply to generate Vsplit. Instead, the intermediate swings are generated by the thevenin equivalent source of $(Vcc/2)*R2/(R1+R2)$.

Figure 6:
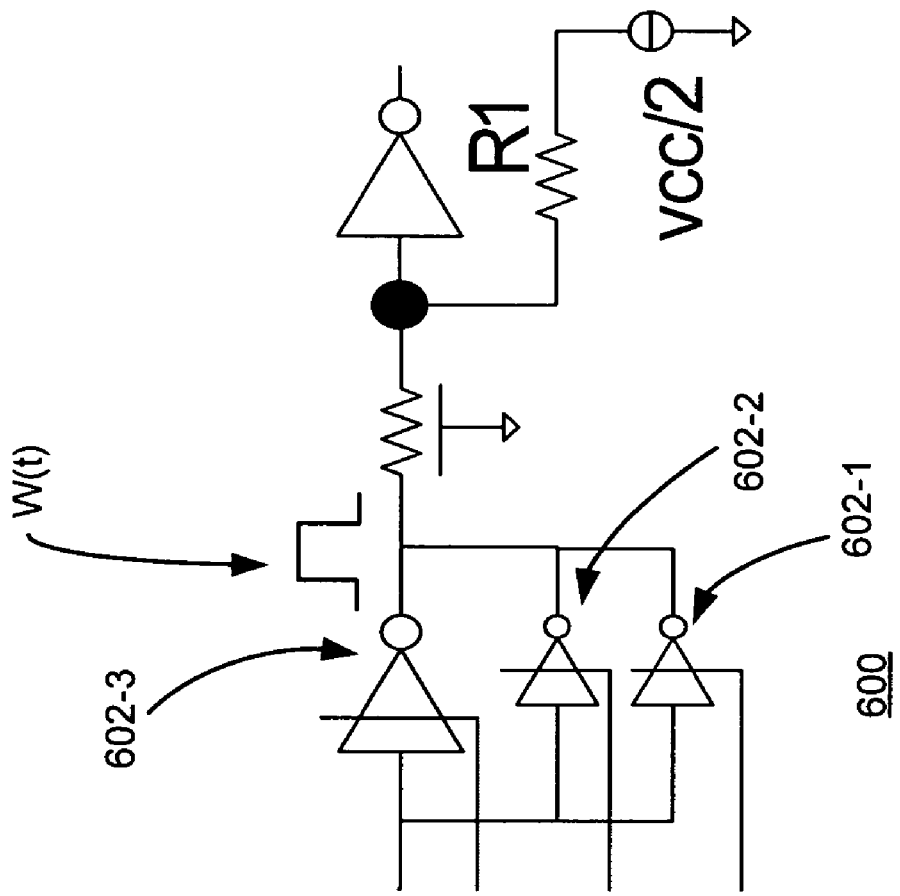
FIG. 6 is a circuit diagram of selected aspects of an interface circuit using tri-state drivers and receivers according to an embodiment of the invention.
Figure 6:
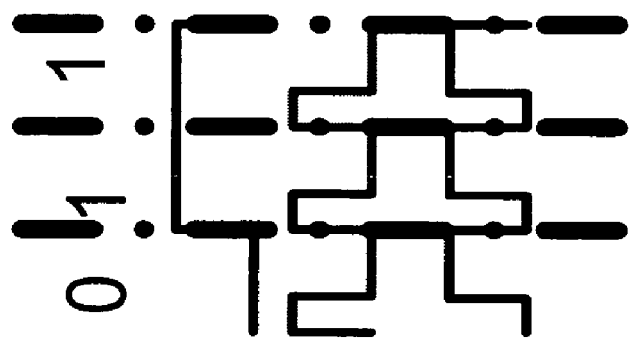

FIG. 6 is a circuit diagram of an embodiment of driver circuitry using tri-state drivers, according to an embodiment of the invention. Circuit 600 uses weak tri-state drivers 602 to replace the resistor, R2, which is used in circuit 500 (shown in FIG. 5). The number of active tri-state drivers may be modulated to generate W(t). In some embodiments, the modulation of the number of active tri-state drivers enables circuit 600 to modify the edge rate of W(t) and/or to modify the voltage swing of W(t). The modulation of the number of active tri-state drivers also enables circuit 600 to use a signaling scheme based on the weighted NZ and NRZ representations of the signal to be transmitted on the interconnect.

Figure 7:
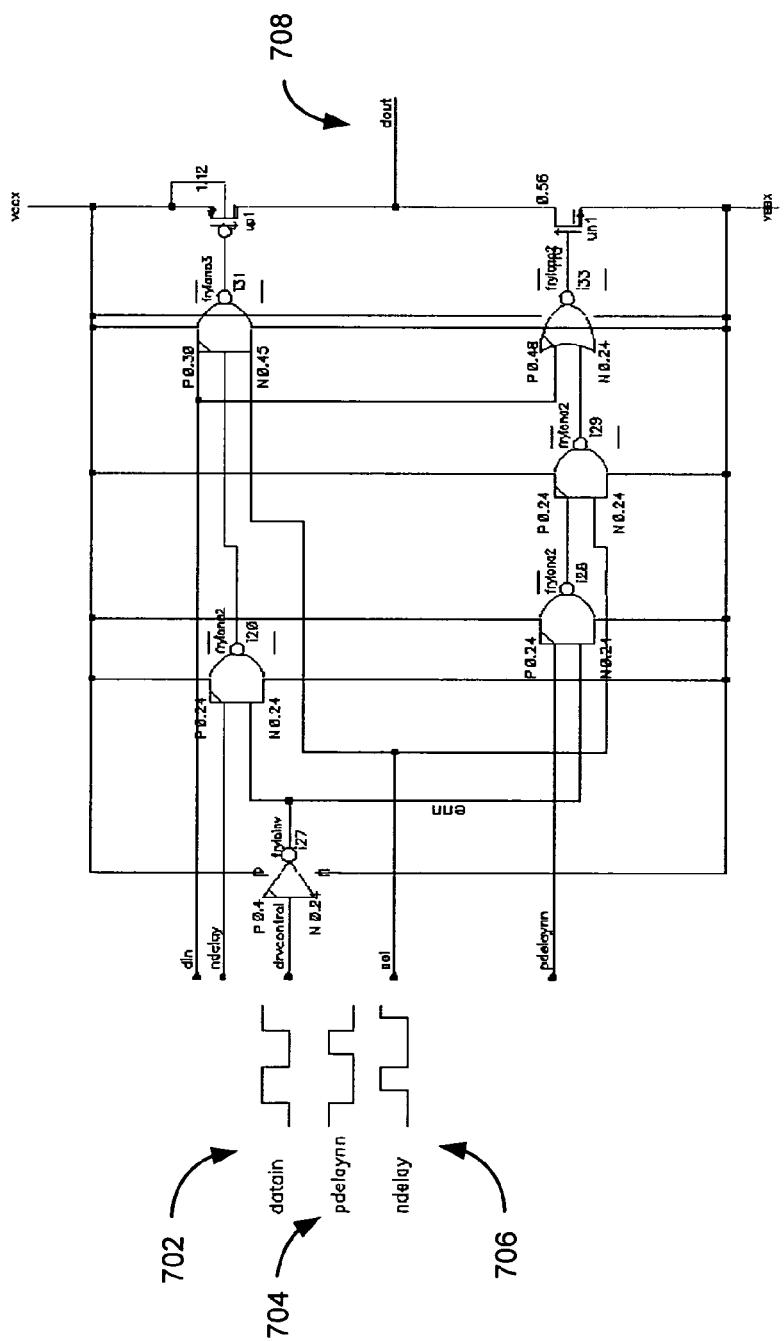
FIG. 7 is a circuit diagram of a tri-state driver implemented according to an embodiment of the invention.

FIG. 7 is a circuit diagram of a tri-state driver implemented according to an embodiment of the invention. Driver 700 may be one of a plurality of drivers used in the driver circuitry (e.g., driver circuitry 208, shown in FIG. 2). For example, driver 700 may be any of the tri-state drivers shown in circuit 600 of FIG. 6. In some embodiments, the smallest (or weakest) tri-state driver (e.g., 602-1) may be one instance of Driver 700. Successively larger (or stronger) tri-state drivers (e.g., 602-2 and 602-3) may include multiple instances (e.g., 2, 4, . . . , N) of driver 700 coupled in parallel.

Driver 700 receives as an input a data signal and one more or more modified edge signals. For example, in the illustrated embodiment, driver 700 receives data signal 702, and edge detect signals 704 and 706. In alternative embodiments, driver 700 may receive a different number of modified edge signals (e.g., 1, 3, 4, . . . , etc.). The output of driver 708 (e.g., the signal duration of the output) is based, at least in part, on modified edge signals 704 and 706. In addition, the output of driver 708 may be based on one or more control bits that determine whether a particular instance of driver 700 is active.

Figure 8:
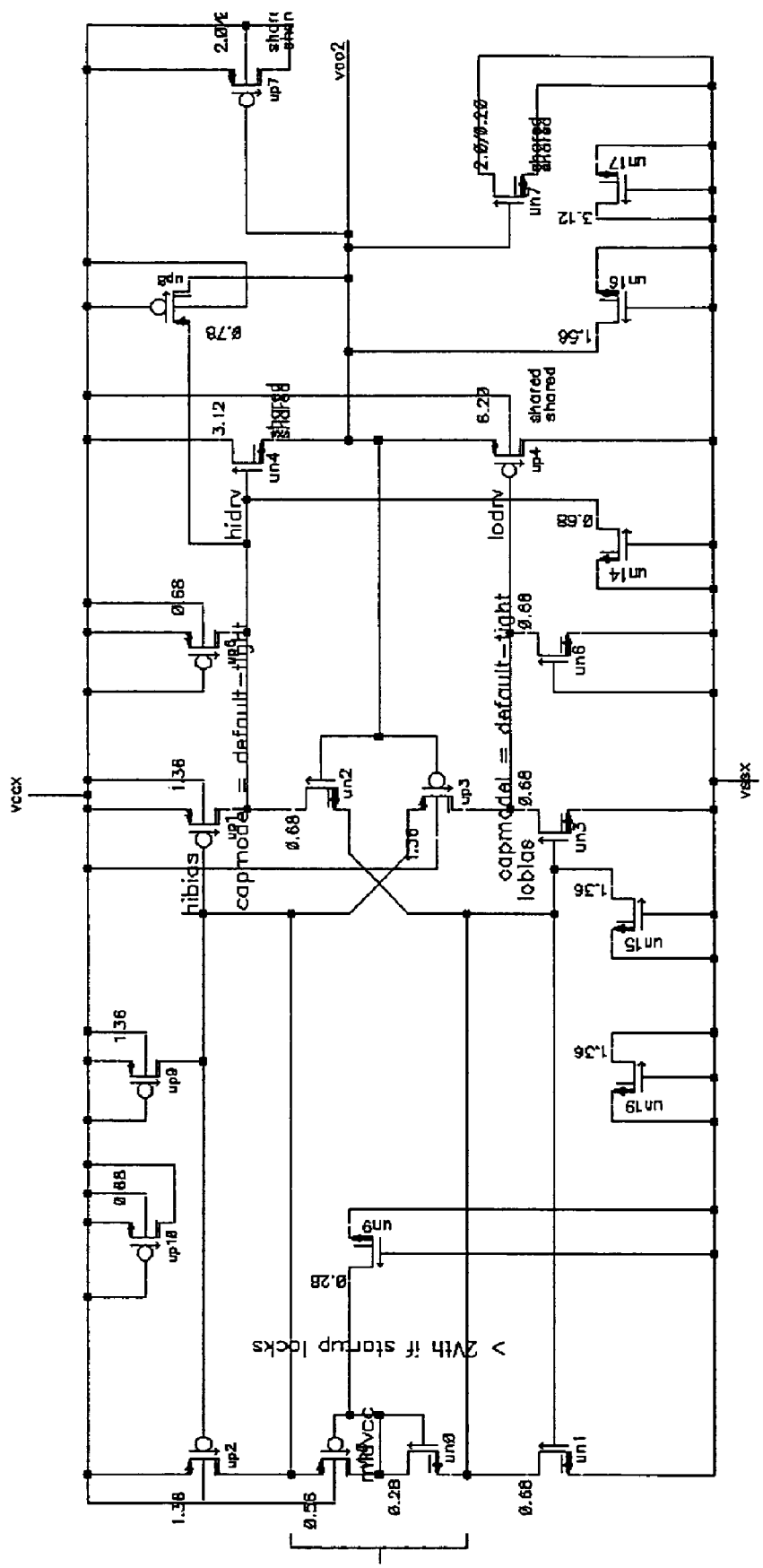
FIG. 8 is a circuit diagram of a Vcc/2 reference circuit (part of receiver circuitry) implemented according to an embodiment of the invention.

FIG. 8 is a circuit diagram of a Vcc/2 reference circuit implemented according to an embodiment of the invention. In some embodiments, circuit 800 is used to provide a reference voltage (e.g., VT) to a receiver (e.g., receiver 204, shown in FIG. 2). In such an embodiment, the amplitude difference between a logic 0 and a logic 1 can be reduced because the threshold voltage of the receiver is tied to Vcc/2. In alternative embodiments of the invention, a different circuit may be used to provide a reference voltage to the receiver.

Figure 9:
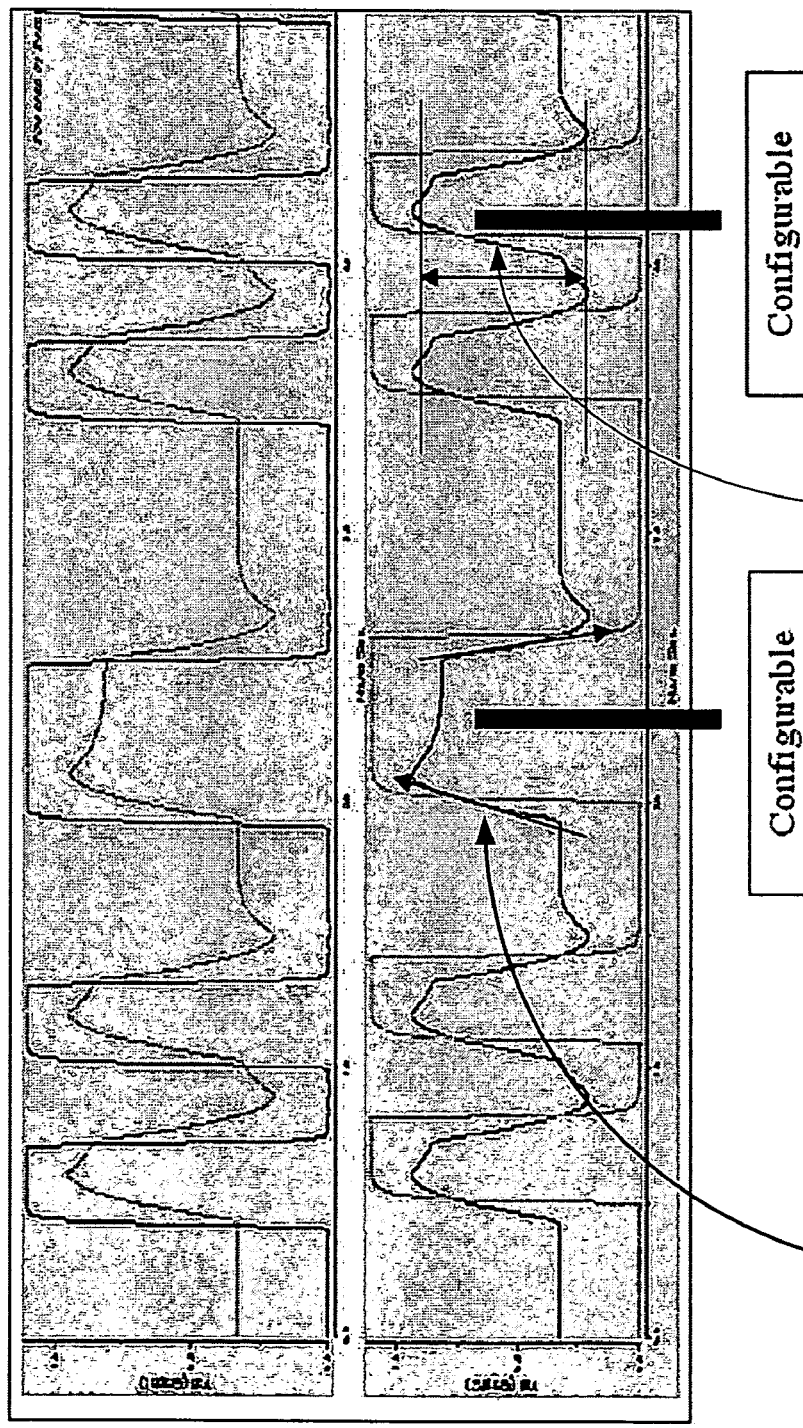
FIG. 9 illustrates waveforms provided by an interface circuit (e.g., part of a driver) implemented according to an embodiment of the invention.

FIG. 9 illustrates waveforms provided by an interface circuit implemented according to an embodiment of the invention. Reference number 902 illustrates that, in some embodiments, the edge rate of a signal transmitted from an interface is modifiable. In some embodiments, the edge rate is modified based on the number of drivers (e.g., drivers 208, shown in FIG. 2) that are currently active. In alternative embodiments, a different mechanism may be used to modify the edge rate of a transmitted signal.

Referring to reference number 904, in some embodiments, the voltage swing of a signal transmitted from an interface is modifiable. In some embodiments, the voltage swing is modified by dynamically changing the number of drivers that are currently active. In alternative embodiments, a different mechanism may be used to modify the edge rate of a transmitted signal.

Figure 10:
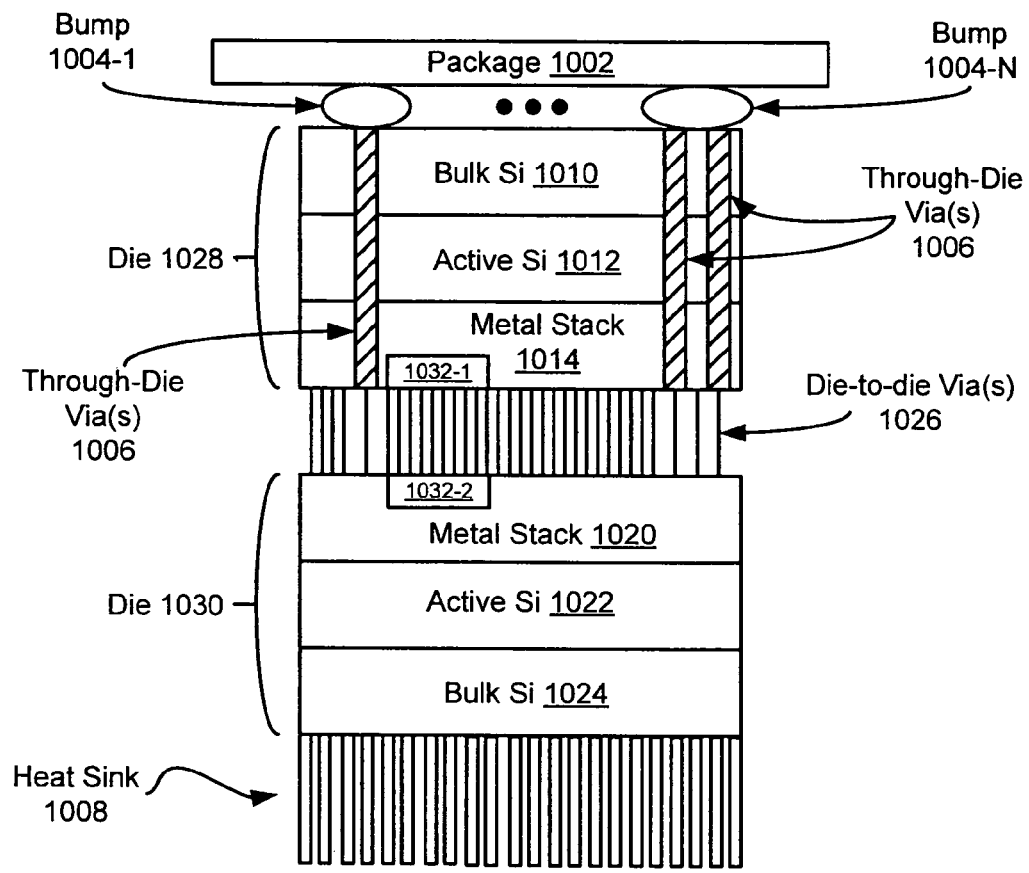
FIG. 10 is a cross-sectional view of a semiconductor device, implemented according to an embodiment of the invention.

FIG. 10 illustrates a cross-sectional view of a semiconductor device 1000 in accordance with an embodiment of the invention. Device 1000 may include a package 1002, die 1028, die 1030, and die-to-die vias 1026. One or more bumps 1004-1 through 1004-N (collectively referred to herein as "bumps 1004") may allow electrical signals including power, ground, clock, and/or input/output (I/O) signals to pass between the package 1002 and the die 1028. As shown in FIG. 2, the die 1028 may include one or more through-die vias 1006 to pass signals between the bumps 1004 and the die 1030. The device 1000 may further include a heat sink 1008 to allow for dissipation of generated heat by the die 1030 and/or device 1000.

As illustrated in FIG. 2, dies 1028 and 1030 may include various layers. For example, die 1028 may include a bulk silicon (SI) layer 1010, an active Si layer 1012, and a metal stack 1014. Die 1030 may include a metal stack 1020, an active Si layer 1022, and a bulk Si layer 1024. As shown in FIG. 2, the vias 1026 may communicate with the dies 1028 and 1030 through the metal stacks 1014 and 1020, respectively. In an embodiment, die 1028 may be thinner than die 1030. For example, die 1028 may include a memory device (such as a random access memory device) and die 1030 may include one or more processor cores and/or shared or private caches. As with device 100 of FIG. 1, device 1000 may include additional dies, e.g., to integrate other components into the same device or system. In such an embodiment, die-to-die and/or through-die vias may be used to communicate signals between the various dies (e.g., such as discussed with respect to the vias 1026 and 1006).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A circuit comprising:
    edge detect circuitry to receive a data signal and to provide a short pulse at a rising and a falling edge of the data signal;
    driver circuitry to receive the data signal and the short pulse and to output a weighted sum signal, wherein the weighted sum signal is a weighted sum of a return-to-zero (RZ) and a non-RZ (NRZ) representation of the data signal; and
    receiver circuitry to be driven by the weighted sum signal.

2. The circuit of claim 1, wherein the driver circuitry comprises a plurality of drivers and further wherein an edge rate of the weighed sum signal is selectively determined based, at least in part, on a number of the plurality of drivers that are turned on.

3. The circuit of claim 2, wherein the driver circuitry includes edge rate configuration circuitry to configure, at least in part, an edge rate of the weighted sum signal.

4. The circuit of claim 1, wherein the driver circuitry comprises a plurality of drivers and further wherein a voltage swing of the weighed sum signal is selectively determined based, at least in part, on a number of the plurality of drivers that are turned on.

5. The circuit of claim 4, wherein the driver circuitry includes voltage swing configuration circuitry to configure, at least in part, a voltage swing of the weighted sum signal.

6. The circuit of claim 4, wherein at least some of the plurality of drivers are tri-state drivers.

7. The circuit of claim 1, wherein during a first portion of a signal transmission cycle, the driver circuitry provides maximum driver current and during a second portion of the signal transmission cycle, the driver circuitry provides less than the maximum driver current.

8. The circuit of claim 7, wherein the driver circuitry includes a plurality of drivers and further wherein at least some of the drivers are tri-state drivers.

9. The circuit of claim 8, wherein a number N of the plurality of drivers are on during the first portion of the signal transmission cycle and a number M of the plurality of drivers are on during the second portion of the signal transmission cycle and wherein N is greater than M.

10. An interface circuit comprising:
edge detect circuitry to receive a data signal and to provide a short pulse at a rising and a falling edge of the data signal; and
driver circuitry to receive the data signal and the short pulse as inputs and to output a weighted sum signal to an input of a receiving circuitry, the driver circuitry including a plurality of drivers, wherein an edge rate of the weighted sum signal is selectively determined based, at least in part, on a number of the plurality of drivers that are turned on, and the weighted sum signal comprises a weighted sum of a return-to-zero (RZ) and a non-RZ (NRZ) representation of the data signal.

11. The interface circuit of claim 10, wherein the driver circuitry includes voltage swing configuration circuitry to configure, at least in part, the voltage swing of the weighted sum signal.

12. The interface circuit of claim 10, wherein a voltage swing of the weighted sum signal is selectively determined based, at least in part, on a number of the plurality of drivers that are turned on.

13. The interface circuit of claim 10, wherein at least some of the plurality of drivers are tri-state drivers.

14. An interface circuit comprising:
edge detect circuitry to receive a data signal and to provide a short pulse at a rising and a falling edge of the data signal;
driver circuitry to receive the data signal and the short pulse as inputs and to output a weighted sum signal to an input of a receiving circuitry, the driver circuitry including a plurality of drivers, wherein a voltage swing of the weighted sum signal is selectively determined based, at least in part, on a number of the plurality of drivers that are turned on and the weighted sum signal comprises a weighted sum of a return-to-zero (RZ) and a non-RZ (NRZ) representation of the data signal.

15. The interface circuit of claim 14, wherein the driver circuitry includes voltage swing configuration circuitry to configure, at least in part, the voltage swing of the weighted sum signal.

16. The interface circuit of claim 14, wherein an edge rate of the weighted sum signal is selectively determined based, at least in part, on a number of the plurality of drivers that are turned on.

17. The interface circuit of claim 14, wherein at least some of the plurality of drivers are tri-state drivers.

18. A system comprising:
a first die having an interface circuit, the interface circuit including
edge detect circuitry to receive a data signal and to provide a short pulse at a rising and a falling edge of a data signal, and
driver circuitry to receive the data signal and the short pulse and to output a weighted sum signal, wherein the weighted sum signal is a weighted sum of a return-to-zero (RZ) and a non-RZ (NRZ) representation of the data signal; and
a second die stacked on the first die, wherein the second die includes an interface circuit having a receiver to receive the weighted sum signal from the first die.

19. The system of claim 18, further comprising:
an interconnect coupled between the interface circuit of the first die and the interface circuit of the second die.

20. The system of claim 18, wherein a reference voltage of the receiver is substantially equal to Vcc/2.

21. The system of claim 18, wherein the driver circuitry comprises a plurality of drivers and further wherein an edge rate of the weighted sum signal is selectively determined based, at least in part, on a number of the plurality of drivers that are turned on.

22. The system of claim 21, wherein the driver circuitry includes edge rate configuration circuitry to configure, at least in part, an edge rate of the weighted sum signal.

23. The system of claim 21, wherein the driver circuitry includes voltage swing configuration circuitry to configure, at least in part, a voltage swing of the weighted sum signal.

24. The system of claim 18, wherein the driver circuitry comprises a plurality of drivers and further wherein a voltage swing of the weighted sum signal is selectively determined based, at least in part, on a number of the plurality of drivers that are turned on.

25. The system of claim 18, wherein during a first portion of a signal transmission cycle, the driver circuitry provides maximum driver current and during a second portion of the signal transmission cycle, the driver circuitry provides less than the maximum driver current.

26. The system of claim 25, wherein a number N of the plurality of drivers are on during the first portion of the signal transmission cycle and a number M of the plurality of drivers are on during the second portion of the signal transmission cycle and wherein N is greater than M.

* * * * *